Nov. 22, 1938.                G. A. CARLSON                2,137,564
                               BELT FASTENER
                            Filed May 19, 1938
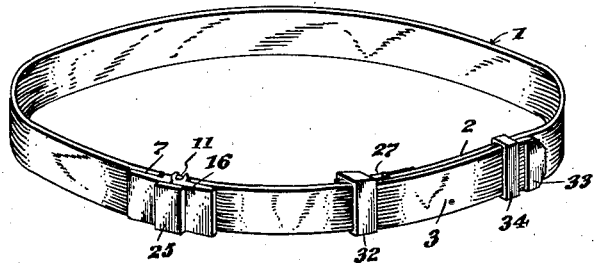
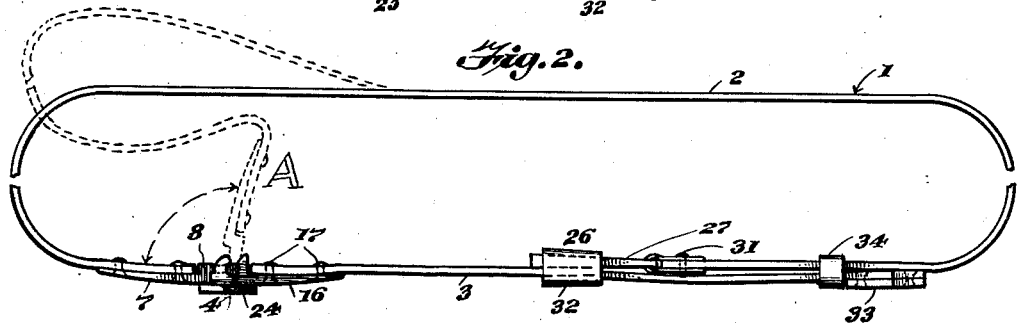
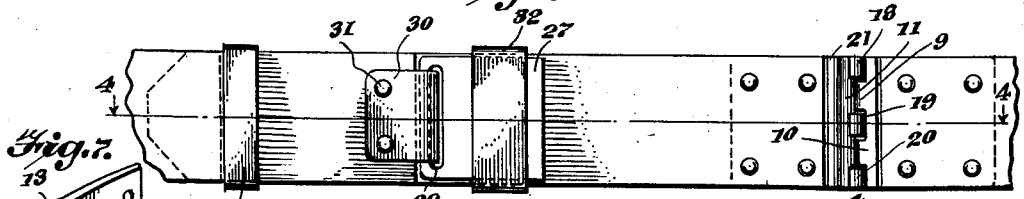
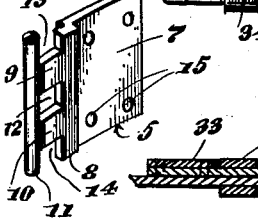
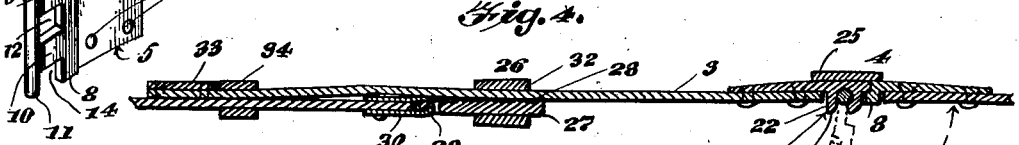
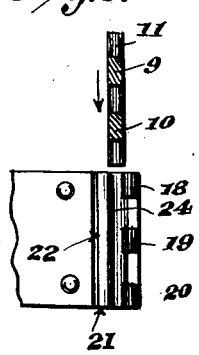
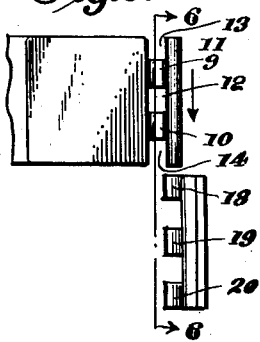
Inventor,
Gustav Alfred Carlson.
By E. E. Vrooman & Co.,
His Attorneys Patented Nov. 22, 1938

2,137,564

UNITED STATES PATENT OFFICE 2,137,564

BELT FASTENER

Gustav Alfred Carlson, Chillicothe, Ill.

Application May 19, 1938, Serial No. 208,904

3 Claims. (Cl. 24—201)

This invention relates to a body belt, and more particularly to the fastening devices thereof.

An object of the invention is the construction of a simple and efficient fastening device, whereby the ends of the belt can be quickly assembled or disassembled.

Another object of the invention is the provision of a simple and efficient clamping device, whereby overlapping portions or sections of the belt can be efficiently retained together while the belt is on the wearer.

A still further object of the invention is the construction of a belt, the component parts of which are efficient in operation, as well as being attractive in appearance.

With the foregoing and other objects in view, the invention comprises certain novel constructions, combinations and arrangements of parts as will be hereinafter fully described, illustrated in the accompanying drawing, and more particularly pointed out in the appended claims.

In the drawing:

Figure 1 is a perspective view of a belt constructed in accordance with the present invention, while Figure 2 is an enlarged plan view of same.

Figure 3 is a fragmentary elevation of the inside of the belt.

Figure 4 is a sectional view taken on line 4—4, Figure 3, and looking in the direction of the arrows.

Figure 5 is a view in elevation of the belt fastener.

Figure 6 is a sectional view taken on line 6—6, Figure 5, and looking in the direction of the arrows.

Figure 7 is a perspective view of the male section of the belt fastener.

Figure 8 is a perspective view of the female section of the belt fastener.

Referring to the drawing by numerals, the belt 1 comprises a primary section 2 and an auxiliary section 3. These sections 2 and 3 may be made of any material that the constructor desires and can be made up in any pattern or design to please the aesthetic sense of the purchasing public.

The belt fastener 4, for holding the ends of sections 2 and 3 in their assembled position, comprises a male section 5 and a female section 6. The male section 5, Fig. 7, comprises a plate 7 provided on its inner end with a Z-shape off-set 8; this Z-shape off-set 8 is provided with two parallel horizontal spaced lugs 9 and 10. Integral with the outer ends of lugs 9 and 10 is a vertically-extending round bar 11. Between lugs 9 and 10 is a square opening 12. Above lug 9 is notch 13 and below lug 10 is notch 14. The plate 7 is suitably apertured, as at 15, for receiving rivets or other fastening means for securing the plate to the primary section 2 as shown in Figures 1 and 2.

The female section 6 of the belt fastener 4 comprises apertured plate 16, which plate is secured by rivets 17 to the auxiliary section 3. Near the inner vertical edge of plate 16, and on its inner face, is upper integral hook 18, central hook 19, and lower hook 20, Fig. 8. A vertical bar 21 is formed integrally with plate 16 contiguous to the outer ends of hooks 18, 19, and 20. This vertical bar 21 has a straight outer face 22 and a rounded or bevelled inner face 23; the inner portion of face 23, together with the inner faces of the horizontal hooks, 18, 19, and 20, form a receiving-socket 24 for receiving the round bar 11. A guard plate 25 is secured to the outer plate 16, and this guard plate bridges across the meeting edges of the male and female sections of the belt fastener. When the sections of the belt fastener are assembled, as shown in Figures 1, 2, 3 and 4, and it is desired to disassemble said sections, the male section 5 must be turned to the position shown by dotted lines A, Figs. 2 and 4, and then the bar 11 can be slid out of the socket 24. When it is desired to assemble the sections of the belt fastener, the male section has to be placed, with respect to the female section, in substantially a right-angled position, as shown by dotted lines A, and then the bar is slid down into the socket 24. Then the operator swings the male section in alignment with the female section (Figs. 1, 2, 3 and 4), whereupon upper hook 18 will enter upper notch 13, central hook 19 will enter the square opening 12 and the lower hook 20 will enter the lower notch 14. By reason of the novel structure and operation of central hook 19 in opening 12, the sections of the belt fastener are positively locked together, when they are in alignment, as clearly shown in Fig. 4; in other words, these parts interlock, and to release them the male section must be turned to the dotted position A, whereupon the central hook 19 is moved out of the square opening 12, so that a sliding action of the bar can be accomplished. Therefore, it will be seen that I have provided a novel, simple and efficient locking device on a belt fastener, for holding its male and female sections in an assembled position.

The clamping device 26 comprises a wedge-shape plate 27 provided with a tooth or corrugated inner face 28 (Fig. 4.) Near the inner end of wedge plate 27 is a slot 29, and in this slot 29 is a U-shape plate 30. This U-shape plate 30 straddles an end of primary section 2, and is secured thereon by means of rivets 31. Slidably mounted on wedge plate 27 and auxiliary section 3 is a band slide 32. Therefore, when the sections 2 and 3 are adjusted to fit the body of the wearer, the band slide 32 is first slid inwardly on wedge plate 27 and then the sections of the belt are adjusted, whereupon the operator slides the band slide 32 towards the outer end of wedge plate 27, causing the finely corrugated inner face of the wedge plate to grip section 3 and securely hold the belt, fitting snugly upon the wearer.

The outer end of auxiliary section 3 is provided with an ornamental plate 33. Slidably mounted upon section 3 and section 2, normally contiguous to ornamental plate 33 is another band slide 34. This slide 34 assists in holding the extreme end of section 3 snugly against the primary section 2 (Figs. 1 and 2.)

In cross section the band slide 32 is substantially conical of wedge-shape to cause the clamping action thereof upon wedge plate 27 and section 3, when the band slide 32 is slid towards the outer end of plate 27.

The operation of the component parts of my novel belt are very simple, and as a result of the efficient action a satisfactory body belt is provided. That is to say, the operator can quickly assemble the sections of the belt fastener, "hinging" the parts to their interlocking position, as clearly shown in Fig. 2, and then the slides 32 and 34 can be adjusted for holding the sections 2 and 3 not only in the proper position upon the wearer, but also in their snugly assembled position with respect to the sections.

While I have described the preferred embodiment of my invention and illustrated the same in the accompanying drawing, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a belt fastener, the combination of a male and a female section, said male section comprising a flat plate provided on its inner end with a Z-shape off-set, said Z-shape off-set provided on its outer edge with a pair of horizontal lugs, said lugs provided on their outer ends with a rounded bar, said lugs, Z-shape off-set, and bar producing an upper and a lower notch and a central opening, said female section comprising a flat plate provided near its inner end with a horizontally-extending upper hook, a central hook, and a lower hook, said last-mentioned flat plate provided with a vertical bar near the outer ends of said hooks and said bar provided with an inner rounded face, whereby said face and the inner faces of said hooks produce a receiving-socket, said first-mentioned bar in said receiving-socket, and said upper and lower hooks in said upper and lower notches and said central hook in said central opening, substantially as shown and described.

2. In a belt fastener, the combination of a male and a female section, said male section comprising a flat plate provided on its inner end with an off-set, said off-set provided on its outer edge with horizontal lugs, said lugs provided on their outer ends with a bar, said female section comprising a flat plate provided near its inner end with hooks, said last-mentioned flat plate provided with a vertical bar near the outer ends of said hooks, whereby said hooks and vertical bar produce a receiving-socket, said first-mentioned bar in said receiving-socket, and said hooks positioned partly around said first-mentioned bar, and contiguous to said lugs.

3. In a belt fastener, the combination of a male and a female section, said female section comprising a flat plate provided on one side only with aligned hooks and a bar extending the width of said flat plate, said male section provided with an off-set bar, and said off-set bar adapted to be placed on said female section between said hooks and the first-mentioned bar.

GUSTAV ALFRED CARLSON.